July 28, 1959  B. M. WOJCIECHOWSKI  2,897,422
THREE ELECTRODE CAPACITOR
Filed May 11, 1955

INVENTOR
B. M. WOJCIECHOWSKI
BY
W.C. Parnell
ATTORNEY

United States Patent Office 2,897,422
Patented July 28, 1959

2,897,422

THREE ELECTRODE CAPACITOR

Bogumil M. Wojciechowski, New York, N.Y., assignor to Western Electric Company, Incorporated, New York, N.Y., a corporation of New York Application May 11, 1955, Serial No. 507,624

3 Claims. (Cl. 317—249)

This invention relates to an electrical capacitor and has for its object a highly stable, three electrode capacitor such as may be used in the eccentricity and thickness measuring system disclosed in Patent 2,721,975 which issued to applicant October 25, 1955, or in a circuit as disclosed in Patent 2,309,490 which issued January 26, 1943 to C. H. Young.

According to the general features of the invention, the capacitor has two direct capacitance electrodes and a third electrically conductive apertured electrode interposed between them. With this structure, the electrostatic field between the two direct capacitance electrodes is determined by the field or links which pass through the apertures of the third electrode while the fringe effects due to the outer edges of the direct capacitance electrodes are substantially eliminated.

According to an important feature of the invention, the third electrode completely shields one of the direct capacitance electrodes from the other except for the holes through the third electrode which are provided for the express purpose of defining the area of the electric field between the two.

According to another important feature, the third electrode shielding structure may in turn be shielded by one of the direct capacitance electrodes when it is grounded as in the system of my above co-pending application.

According to another feature, the third electrode shielding may enclose both direct capacitance electrodes with particular advantage when the third electrode is grounded as in the above Young patent.

Another important feature is that the effective spacing between the two direct electrodes may be continuously varied to change the capacitance of the condenser.

According to still another important feature, the third electrode may be constructed of a low temperature coefficient material and the other electrodes may be mounted thereon thus permitting the use of less expensive materials for the direct capacitance electrodes and related structure without reducing the stability of the device.

These and other features of the invention will be more fully understood from the following detailed description taken in conjunction with the accompanying drawing, in which.

Figure 1:
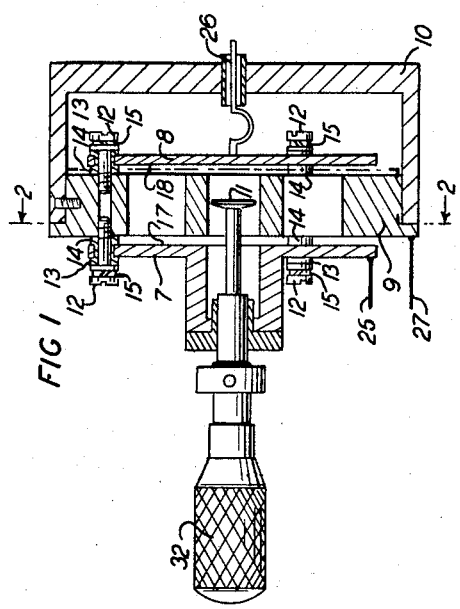
Fig. 1 is a side elevational view of an adjustable capacitor according to the invention showing a third electrode shielding arrangement for one of the direct capacitance electrodes.
Figure 2:
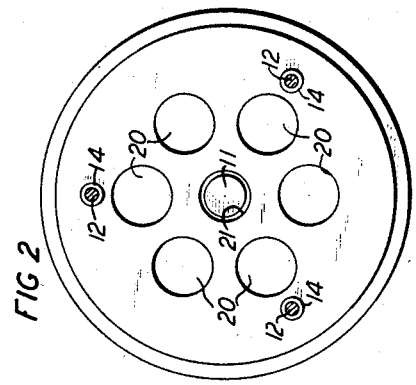
Fig. 2 is a cross-sectional view of the apertured third electrode along the plane of lines 2—2 of Fig. 1, and Figs. 3 and 4 are side elevational views of a capacitor showing additional shielding arrangements.

Referring now to the drawing, particularly Figs. 1 and 2, a capacitor constructed in accordance with the present invention includes two direct capacitance electrodes 7 and 8, a third apertured electrode 9, a shield 10 for the electrode 8 and a micrometer adjustable plunger 11 for varying the capacitance between the electrodes 7 and 8. The electrodes 7, 8 and 9 of this embodiment have a circular cross-sectional configuration, but are not necessarily limited to such structure, and are aligned coaxially, the electrodes 7 and 8 being mounted directly to electrode 9 by screws 12 which screw into threaded holes in electrode 9. The screws are insulated from electrodes 7 and 8 by phenol fiber insulators 13 and the electrodes are held apart in fixed spaced relation by fused quartz spacers 14. Spring washers 15 on the screws adjacent the heads hold the assembly of the electrodes and spaces under a substantially even pressure and in fixed position regardless of temperature variations. The electrode 9 is constructed of low temperature coefficient material such as the iron-nickel alloy Invar or plated quartz. Since the electrode 9 and spacers 14 are of low temperature coefficient material, the spacing between the opposed faces 17 and 18 of electrodes 7 and 8 respectively remains substantially constant for changes in temperature even though the electrodes 7 and 8, the screws 20 and associated structure may be made of high temperature coefficient material. The plates 7 and 8 may, therefore, be made of brass, aluminum or other suitable electrode material. This results, therefore, in a highly stable capacitor arrangement which is inexpensive and easily fabricated.

The third electrode 9 has a central aperture 21 in which the micrometer adjustable plunger 11, which is mechanically and electrically connected to the electrode 7, may be accurately positioned for varying the direct capacitance between electrodes 7 and 8. The electrode 9 also has a plurality of holes 20 spaced uniformly around hole 21 which are positioned well within the peripheral edges of the coaxially aligned electrodes 7 and 8 so that substantially none of the electrostatic field between the two direct capacitance electrodes 7 and 8 will extend over their outer edges but be confined to the holes in electrode 9.

A can-like shield 10 connected to electrode 9 completely shields the electrode 8 from electrode 7 except for the holes through electrode 9. A jack 26 to which a wire from electrode 8 is connected is provided for making electrical connection to electrode 8. Electrical connections shown schematically as 25 and 27 for electrodes 7 and 9 respectively may be conventional, the connection for electrode 9 being made to either the shield 10 or the electrode 9 itself.

Figure 3:
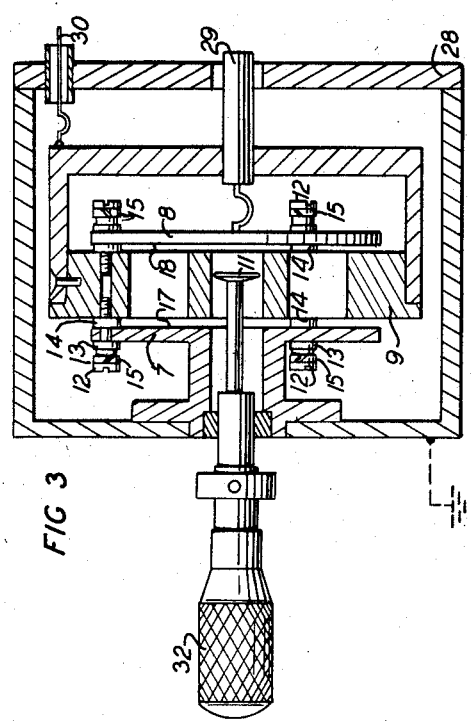

The capacitor shown in Fig. 3 is particularly well suited for a capacitance-to-ground measuring system as disclosed in the above co-pending application. In this system, one of the direct capacitance electrodes, electrode 7, is connected to ground potential, electrode 8 is connected to a relatively high potential and electrode 9 is the neutral or direct capacitance shielding electrode. A shield 28 connected to electrode 7 is provided for enclosing the entire capacitor structure to protect the electrodes 8 and 9 from being touched or exposed to stray electrostatic fields. In this embodiment, jacks 29 and 30 are utilized for making electrical connection with electrodes 8 and 9 respectively. A capacitor of this type, having a capacitance between 1.050 and 1.350 micromicrofarads and constructed with a third electrode 9 of Invar and spacers 14 of fused quartz, has an accuracy of ±.002 micro-microfarads.

Figure 4:
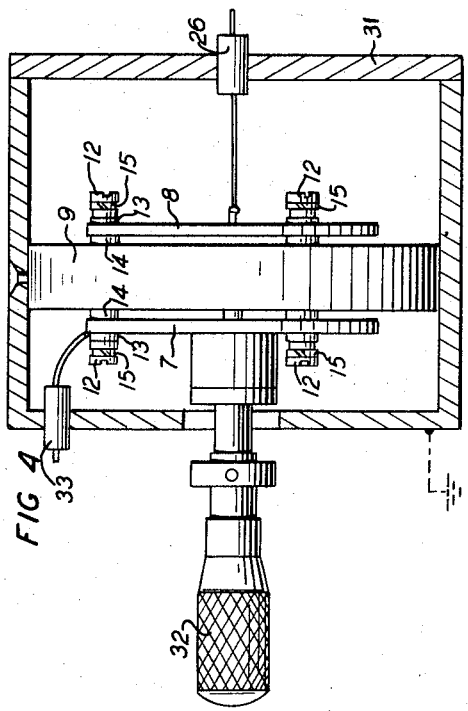

The capacitor of Fig. 4 is particularly well suited for a system where the third electrode is grounded and the electrodes 7 and 8 are "off ground" as in the system of the above Young patent. In this embodiment, the third electrode shield 31 extends around the electrode 7 as well as around electrode 8. An aperture is provided for the micrometer handle 32 and jacks 26 and 33 are utilized for making connection with electrodes 8 and 7 respectively.

With the structure described above, since the electrostatic field is established through the holes in the third electrode, the direct capacitance of the structure will not vary even though the electrodes are accidentally displaced out of coaxial alignment. This structure is, therefore, rugged as well as highly accurate and stable.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A three electrode capacitor comprising two direct capacitance electrodes, a third electrode of low temperature coefficient material having parallel faces with a central aperture and a plurality of other apertures therethrough, means including quartz spacers for mounting the direct capacitance electrodes on opposite faces of the third electrode, an electrically conductive element, means for movably mounting the element to and in conductive connection with one of the direct capacitance electrodes to permit moving the element within the central aperture in the third electrode for changing the capacitance between the direct capacitance electrodes, means connected to the third electrode for shielding one of the direct capacitance electrodes and means connected to the other direct capacitance electrode for shielding the shielding means connected to the third electrode.

2. A three electrode capacitor comprising two direct capacitance electrodes, each having at least one flat face, a flat, apertured, third electrode of low temperature coefficient material interposed between the flat faces of the direct capacitance electrodes with the edges of the third electrode extending beyond the edges of the direct capacitance electrodes to limit the effective electrostatic field between the two direct capacitance electrodes to that established through the apertures of the third electrode, insulating spacers of low temperature coefficient material between each of the direct capacitance electrodes and the corresponding flat faces of the third electrode, resilient means for holding each direct capacitance electrode and the third electrode in pressure contact with the spacers to fix the spacing between electrodes, a first conductive shield member connected to the third electrode and surrounding one of the direct capacitance electrodes, and a second conductive shield member, electrically isolated from the first, connected to the other direct capacitance electrode and surrounding said first shield member.

3. A three electrode capacitor comprising two direct capacitance electrodes, a third electrode of low temperature coefficient material having parallel faces with at least two apertures therethrough, means including insulating spacers of low temperature coefficient for mounting the direct capacitance electrodes on opposite faces of the third electrode, an electrically conductive element, means for movably mounting the element to, and in conductive connection with, one of the direct capacitance electrodes to permit moving the element within one of the apertures in the third electrode for changing the capacitance between the direct capacitance electrodes, means connected to the third electrode for shielding one of the direct capacitance electrodes, and means connected to the other direct capacitance electrode for shielding the shielding means connected to the third electrode.

References Cited in the file of this patent

UNITED STATES PATENTS

| | | |
|---|---|---|
| 1,940,769 | Potter | Dec. 26, 1933 |
| 1,952,924 | Koch | Mar. 27, 1934 |
| 2,014,422 | Carter | Sept. 17, 1935 |
| 2,079,921 | Osnos | May 11, 1937 |
| 2,226,990 | Schlesinger | Dec. 31, 1940 |
| 2,349,440 | Lavoie | May 23, 1944 |
| 2,361,657 | Schock | Oct. 31, 1944 |
| 2,395,623 | Goldstein | Feb. 26, 1946 |
| 2,808,546 | Connor | Oct. 1, 1957 |

FOREIGN PATENTS

| | | |
|---|---|---|
| 458,710 | Great Britain | Dec. 24, 1936 |